United States Patent

Ciokajlo et al.

[11] Patent Number: 5,307,622
[45] Date of Patent: May 3, 1994

[54] COUNTERROTATING TURBINE SUPPORT ASSEMBLY

[75] Inventors: John J. Ciokajlo, Henderson, Nev.; Ambrose A. Hauser, Wyoming, Ohio

[73] Assignee: General Electric Company, Cincinnati, Ohio

[21] Appl. No.: 100,877

[22] Filed: Aug. 2, 1993

[51] Int. Cl.[5] .............................................. F02K 3/072
[52] U.S. Cl. ................................ 60/39.162; 60/39.31; 415/65; 416/128
[58] Field of Search ................... 60/39.162, 268, 39.31; 416/128, 129; 415/65

[56] References Cited

U.S. PATENT DOCUMENTS

| | | | |
|---|---|---|---|
| 3,861,139 | 1/1975 | Jones | 60/268 |
| 4,621,978 | 11/1986 | Stuart | 416/127 |
| 4,758,129 | 7/1988 | Strock et al. | 415/69 |
| 4,767,271 | 8/1988 | Catlow | 416/129 |
| 4,790,133 | 12/1988 | Stuart | 60/226.1 |
| 4,860,537 | 8/1989 | Taylor | 60/226.1 |
| 4,951,461 | 8/1990 | Butler | 60/39.162 |
| 5,079,916 | 1/1992 | Johnson | 60/268 |

Primary Examiner—Richard A. Bertsch
Assistant Examiner—William J. Wicker
Attorney, Agent, or Firm—Jerome C. Squillaro; Nathan D. Herkamp

[57] ABSTRACT

A counterrotating turbine support assembly includes outer and inner rotors having respective outer and inner blades disposed in an outer casing. A mid-frame is disposed forwardly of the rotors and fixedly joined to the outer casing. A rear frame is disposed axially aft of the rotors and is fixedly joined to the outer casing. A forward support shaft is joined at one end to a forward end of the outer rotor and is rotatably supported at an inner end to the mid-frame by a forward bearing. An aft support shaft is joined at one end to an aft end of the outer rotor and is rotatably supported at an inner end to the rear frame by an aft bearing. An intermediate support shaft is fixedly joined at one end to the inner rotor and is rotatably supported at an inner end to the mid-frame by an intermediate bearing.

10 Claims, 4 Drawing Sheets

COUNTERROTATING TURBINE SUPPORT ASSEMBLY

The present invention relates generally to aircraft gas turbine engines, and, more specifically, to a rotor support system thereof.

BACKGROUND OF THE INVENTION

Aircraft gas turbine engines include two or more rotors supported by stationary frames thereof. The rotors carry fan, compressor, and turbine blades having radially outer tips disposed closely adjacent to stationary shrouds for maintaining relatively small blade tip clearances therebetween. Small tip clearances are desired for minimizing the leakage of the motive fluids therepast which decreases efficiency of operation of the engine. Accordingly, the several rotors should be supported in bearings as rigidly as possible for minimizing elastic deflections thereof which can undesirably vary the blade tip clearances as is conventionally known.

In one type of gas turbine engine, a counterrotating power turbine is provided downstream of the core engine for driving forward and aft fan blades either disposed at the forward end of the engine or the aft end of the engine as is conventionally known. Each of the counterrotating turbine rotors includes a respective plurality of rotor blades extending therefrom in predetermined numbers of axial stages. The blade tip clearances at the bottom of the outer rotor blades and at the top of the inner rotor blades are affected by in-plane bending moments of the two rotors due to the various forces encountered during operation of the engine, with it being desirable to control such blade tip clearances by suitably supporting the rotors to stationary frames. Stationary frames are conventionally known and used in various configurations for supporting the power turbine rotors.

However, conventional cantilevered counterrotating rotor support assemblies are suitable for use for blade tip speeds up to about 300 feet/sec (91 meters/sec). Higher speeds substantially increase centrifugal loads and vibratory excitation forces which must be accommodated by the support assembly. For example, the outer blades are subject to compressive column buckling forces and tangential loads which are reacted in part in the outer rotor by hoop stresses. The outer rotor is therefore more subject to radial dynamic motion. And, the inner rotor critical frequencies must be more carefully controlled to avoid undesirable vibratory response. Accordingly, improved support of the power turbine rotors to control deflections due to in-plane bending moments, centrifugal loads, and vibratory response is desired.

SUMMARY OF THE INVENTION

A counterrotating turbine support assembly includes outer and inner rotors having respective outer and inner blades disposed in an outer casing. A mid-frame is disposed forwardly of the rotors and fixedly joined to the outer casing. A rear frame is disposed axially aft of the rotors and is fixedly joined to the outer casing. A forward support shaft is joined at one end to a forward end of the outer rotor and is rotatably supported at an inner end to the mid-frame by a forward bearing. An aft support shaft is joined at one end to an aft end of the outer rotor and is rotatably supported at an inner end to the rear frame by an aft bearing. An intermediate support shaft is fixedly joined at one end to the inner rotor and is rotatably supported at an inner end to the mid-frame by an intermediate bearing.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
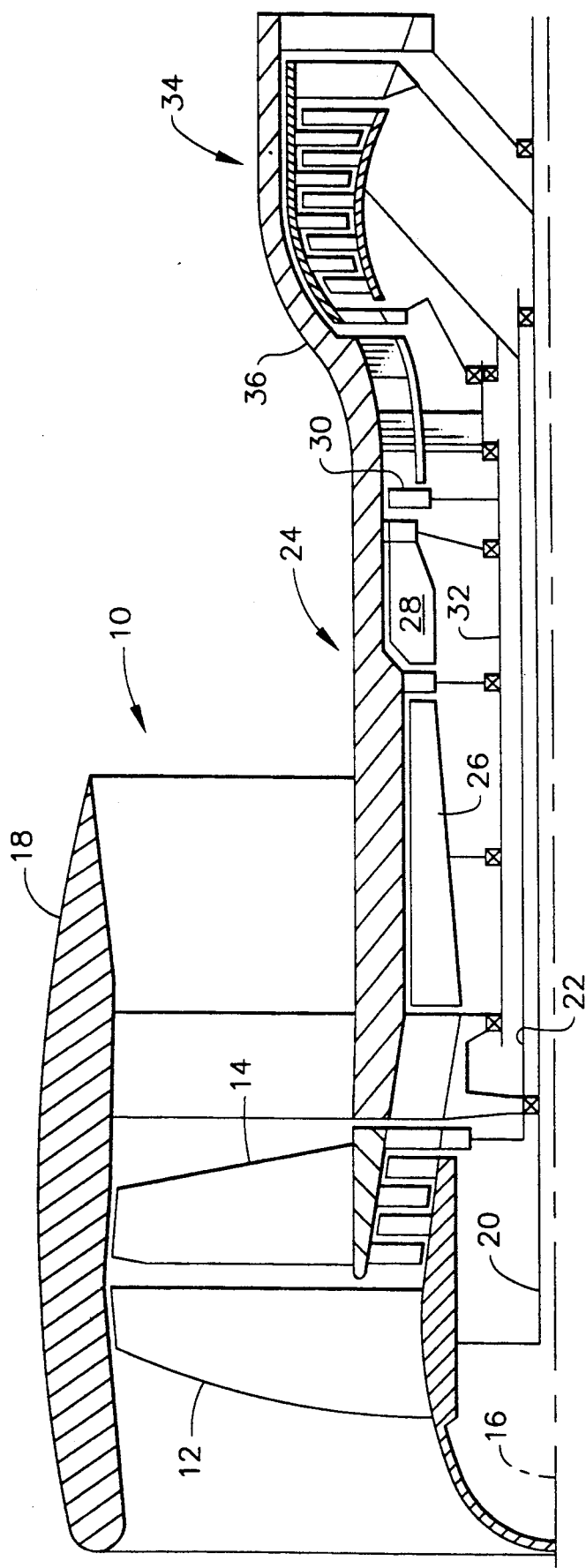
FIG. 1 is a schematic, longitudinal sectional view of the upper half of an aircraft gas turbine engine having counterrotating forward and aft fans powered by a counterrotating turbine with a rotor support assembly in accordance with one embodiment of the present invention.

Illustrated in FIG. 1 is an exemplary aircraft gas turbine engine 10 having an axially front fan 12 and an aft fan 14 disposed axially downstream therefrom about a longitudinal centerline axis 16. The fans 12, 14 include conventional rows of fan blades disposed within a conventional nacelle 18, with the blades being joined to respective rotor disks receiving power through a front fan shaft 20 joined to the front fan 12 and an aft fan shaft 22 joined to the aft fan 14.

Disposed downstream from the fans is a conventional core engine 24 including a high pressure compressor (HPC) 26, combustor 28, and a high pressure turbine (HPT) 30 joined to the HPC 26 by a core rotor or shaft 32. The core engine 24 conventionally generates combustion gases which flow downstream therefrom to a counterrotating power turbine 34 which extracts energy therefrom for powering the fans 12, 14 through their respective fan shafts 20, 22.

Figure 2:
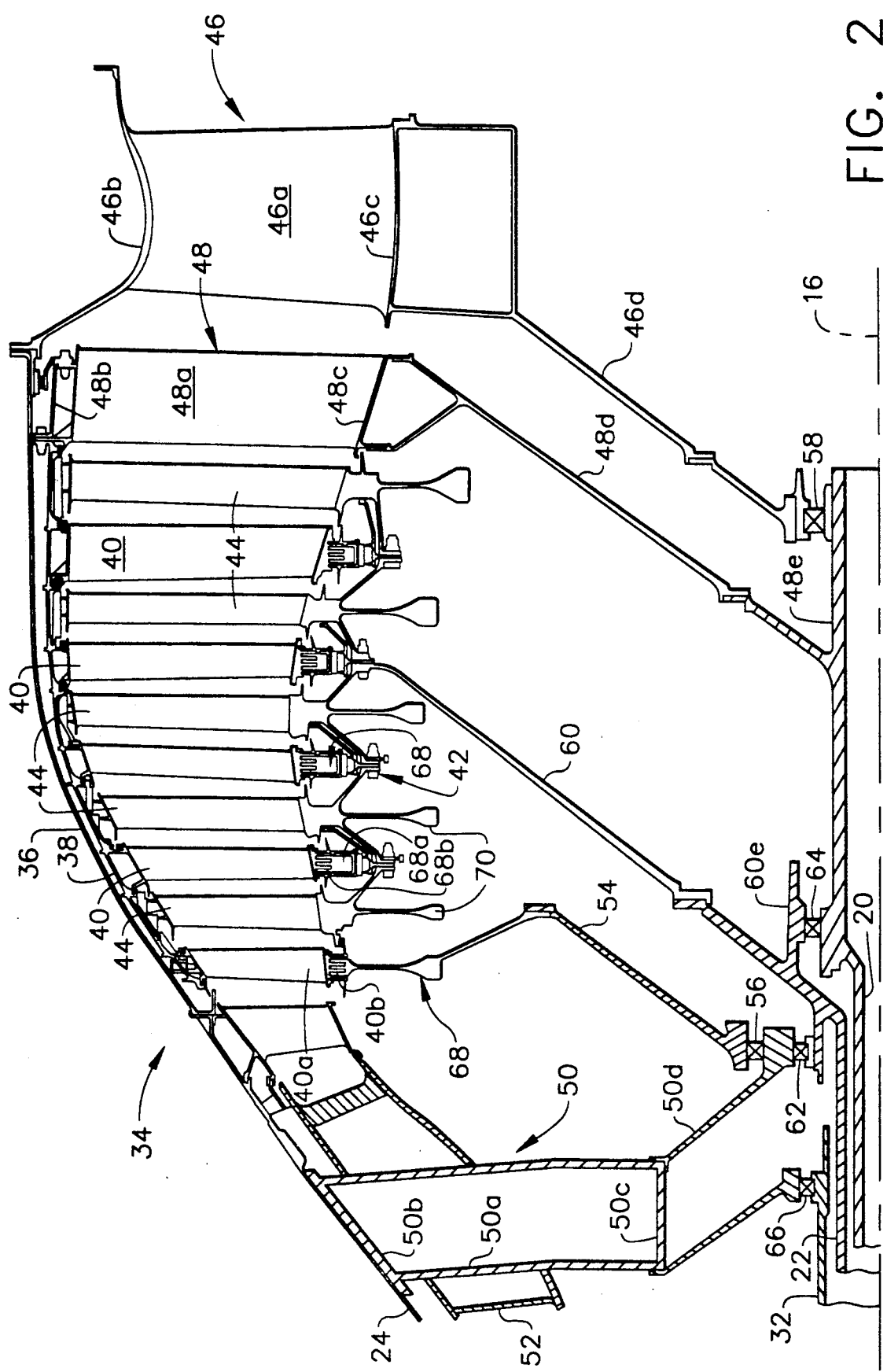
FIG. 2 is an enlarged, schematic view of the counterrotating power turbine illustrated in FIG. 1 and disposed downstream of a high pressure turbine illustrating in more particularity the rotor support assembly thereof.

The power turbine 34 is illustrated in more particularity in FIG. 2 and includes a stationary outer casing 36 conventionally joined to the core engine 24 downstream of the core turbine 30 (FIG. 1). The power turbine 34 includes an annular, radially outer rotor 38 disposed radially inwardly of the outer casing 36 in the form of a generally frustoconical drum having a plurality of conventional, circumferentially spaced apart outer rotor blades 40 extending radially inwardly therefrom in axially spaced apart blade rows or stages, five being illustrated for example. An annular, radially inner rotor 42 is disposed coaxially with the outer rotor 38 about the centerline axis 16 and radially inwardly thereof, and includes a plurality of conventional, circumferentially spaced apart inner rotor blades 44 extending radially outwardly therefrom in axially spaced apart blade rows or stages, five being shown for example, which are axially interdigitated with the outer blade stages, with blade stages of the respective outer and inner rotors 38, 42 being disposed axially between respective stages of the other rotor as is conventionally known. The blades 40, 44 are configured for counterrotation of the rotors 38, 42.

A rotor support assembly in accordance with one embodiment of the present invention includes a stationary annular rear frame 46 disposed aft of the outer and inner blades 40, 44 of the power turbine 34. The rear frame 46 includes a plurality of conventional circumferentially spaced apart struts 46a joined at their outer ends to an annular outer band 46b which in turn is conventionally fixedly joined to the outer casing 36, and joined at their inner ends to an annular inner band or hub 46c. The rear frame 46 also includes an annular rear support shaft 46d extending radially inwardly therefrom. In the exemplary embodiment illustrated in FIG. 2, the rear struts 46a are disposed in flow communication with the aft end of the power turbine 34 for receiving the combustion gases therefrom and do not include conventional fairings surrounding the struts since the combustion gases are at a relatively low temperature.

A rotatable aft frame 48 is disposed axially aft of the outer and inner blades 40, 44 and axially forward of the rear frame 46 and is fixedly joined to the aft end of the outer rotor 38 for rotation therewith and for providing additional rigidity for supporting the blades 40 thereof. The aft frame 48 includes a plurality of circumferentially spaced apart struts 48a fixedly joined to radially outer and inner annular aft bands 48b, 48c, with the inner aft band 48c being fixedly joined to an annular aft support shaft 48d for rotation therewith which extends radially inwardly therefrom and axially forward of the rear frame 46. The outer and inner bands 48b, 48c join together the several struts 48a for creating a relatively rigid assembly, and for carrying loads from the outer rotor 38 to the rear frame 46 through the aft bearing 58.

A stationary annular mid-frame 50 is disposed axially forward of the outer and inner blades 40, 44 and similarly includes a plurality of circumferentially spaced apart forward struts 50a fixedly joined to radially outer and inner annular front bands 50b, 50c, with the inner front band 50c being fixedly joined to an annular shaft 50d extending radially inwardly and axially aft therefrom. In the embodiment illustrated in FIG. 2, the mid-frame 50 at the outer band 50b is fixedly joined to the outer casing 36 at the aft end of the core engine 24. In the exemplary embodiment illustrated in FIG. 2, each of the forward struts 50a is enclosed by a conventional fairing 52 to protect the struts 50a from the hot combustion gases flowing therebetween. In alternate embodiments where the temperature of the combustion gases is not a problem, the fairings 52 may not be necessary.

Each of the frames 46, 48, 50 is a relatively rigid structure since the respective struts thereof are joined to the respective outer and inner annular bands. The rigidity of the frames 46, 48, 50 is used in accordance with the present invention to increase the support rigidity of the respective rotors 38, 42 for decreasing the amount of blade tip clearance variation due to in-plane bending moments which occur during operation of the power turbine 34. Since the aft frame 48 is joined at its outer band 48b to the outer rotor 38, it increases the rigidity thereof. Since the mid-frame 50 is joined at its outer band 50b to the outer casing 36, it provides a rigid support for the front end of the turbine 34. And, blade tip clearances are further reduced by supporting the aft end of the outer rotor 42 to the rear frame 46 in accordance with another feature of the present invention. Since the rear frame 46 is supported at its outer band 46b to the outer casing 36, it has a relatively large diameter with a correspondingly large structural rigidity. By supporting the power turbine 34 both on the rear frame 46 and the mid-frame 50, an improved hard support system is created.

More specifically, an annular forward support shaft 54 as illustrated in FIG. 2 is fixedly joined at a radially outer end thereof to a forward end of the outer rotor 38 at the inner diameter of the forwardmost row or stage-one blades 40a, and is rotatably supported by a forward bearing 56 at a radially inner end thereof directly to the mid-frame 50. The forward support shaft carries loads from the outer rotor 38 to the mid-frame 50 through the forward bearing 56. The aft support shaft 48d at the aft end of the outer rotor 38 is rotatably supported by an aft bearing 58 at a radially inner end thereof to the rear frame 46 at the radially inner end of the rear support shaft 46d. And, an annular intermediate support shaft 60 is fixedly joined at a radially outer end thereof to the inner rotor 42, and is rotatably supported by an intermediate bearing 62 at a radially inner end thereof directly to the mid-frame 50.

As shown in FIG. 2, the forward bearing 56 is mounted radially outwardly of the aft end of the inner support shaft 50d, for directly supporting the forward shaft 54 on the mid-frame 50. The intermediate bearing 62 is mounted radially inwardly of the aft end of the inner support shaft 50d for also directly supporting the intermediate support shaft 60 on the mid-frame 50. And, the aft support shaft 48d includes an integral cylindrical extension 48e and is directly supported thereby by the aft bearing 58 on the rear support shaft 46d of the rear frame 46.

Power from the power turbine 34 is carried from the inner rotor 42 and through the intermediate support shaft 60 to the aft fan shaft 22 conventionally fixedly joined thereto, and from the outer rotor 38 through the aft support shaft 48d and through the front fan shaft 20 conventionally joined to the extension 48e thereof. In this way, the outer rotor 38 is supported at both its forward and aft ends through the respective forward and aft support shafts 54, 48d by the respective bearings 56, 58 joined to the respective mid-frame 50 and the rear frame 46 for providing a relatively hard and rigid support. And, the inner rotor 42 is supported through the intermediate support shaft 60 directly to at least the mid-frame 50 through the intermediate bearing 62. The forward support shaft 54 and the forward bearing 56 cooperate with the aft support shaft 48d and the aft bearing 58 to more fully control in-plane rocking motion of the outer rotor 38 to thereby minimize blade tip clearance variations.

In the preferred embodiment illustrated in FIG. 2, the intermediate support shaft 60 includes a cylindrical aft extension 60e and a conventional differential bearing 64 is disposed between the intermediate support shaft 60 at its aft extension 60e and the aft support shaft 48d through its extension 48e for coupling together the outer and inner rotors 38, 42 for controlling radial dynamic motion of the outer rotor 38 and critical frequencies of the inner rotor 42, for example. In the embodiment illustrated in FIG. 2, the core shaft 32 is also directly supported by the mid-frame 50 through a conventional bearing 66. The several bearings 56, 58, 62, 64, and 66 are all conventional and may be roller bearings for example.

In this way, the power turbine 34 may be operated at higher than conventional blade tip speeds greater than about 91 m/s in view of the improved support system therefor. However, increased blade tip speeds necessarily increase the centrifugal forces which must be carried by the outer and inner blades 40, 44 and their respective outer and inner rotors 38, 42. Accordingly, a plurality of axially spaced apart annular disks or rings 68 are disposed radially between the inner tips of the outer blades 40 and the inner rotor 42. Each of the rings 68 is fixedly joined to the radially inner tip ends of the outer blades 40 of respective ones of the rows thereof for reacting centrifugal radial loads on the outer blades 40 during operation. Accordingly, as the outer rotor 38 and the blades 40 thereon rotate at higher speeds during operation, the rings 68 fixedly joined to the radially inner ends of the outer blades 40 constrain radial outward movement thereof to react a portion of the centrifugal loads by the hoop stresses therein thusly reducing the loads carried by the outer rotor 38.

Figure 3:
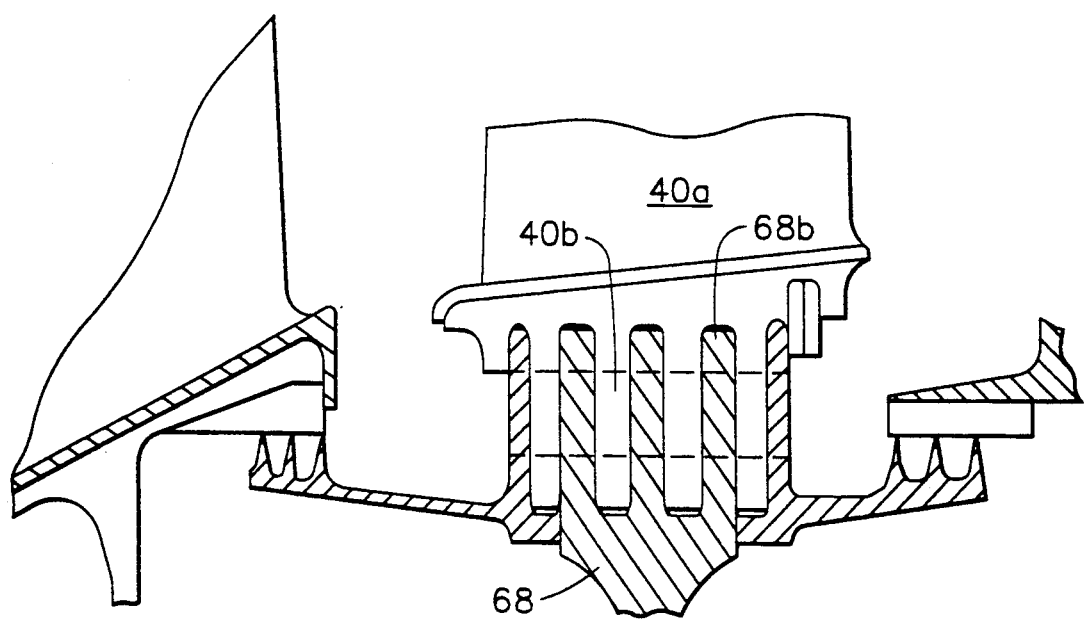
FIG. 3 is an enlarged, partly sectional view of the root portion of the stage-one blade joined to a rotor disk in the power turbine illustrated in FIG. 2.
Figure 4:
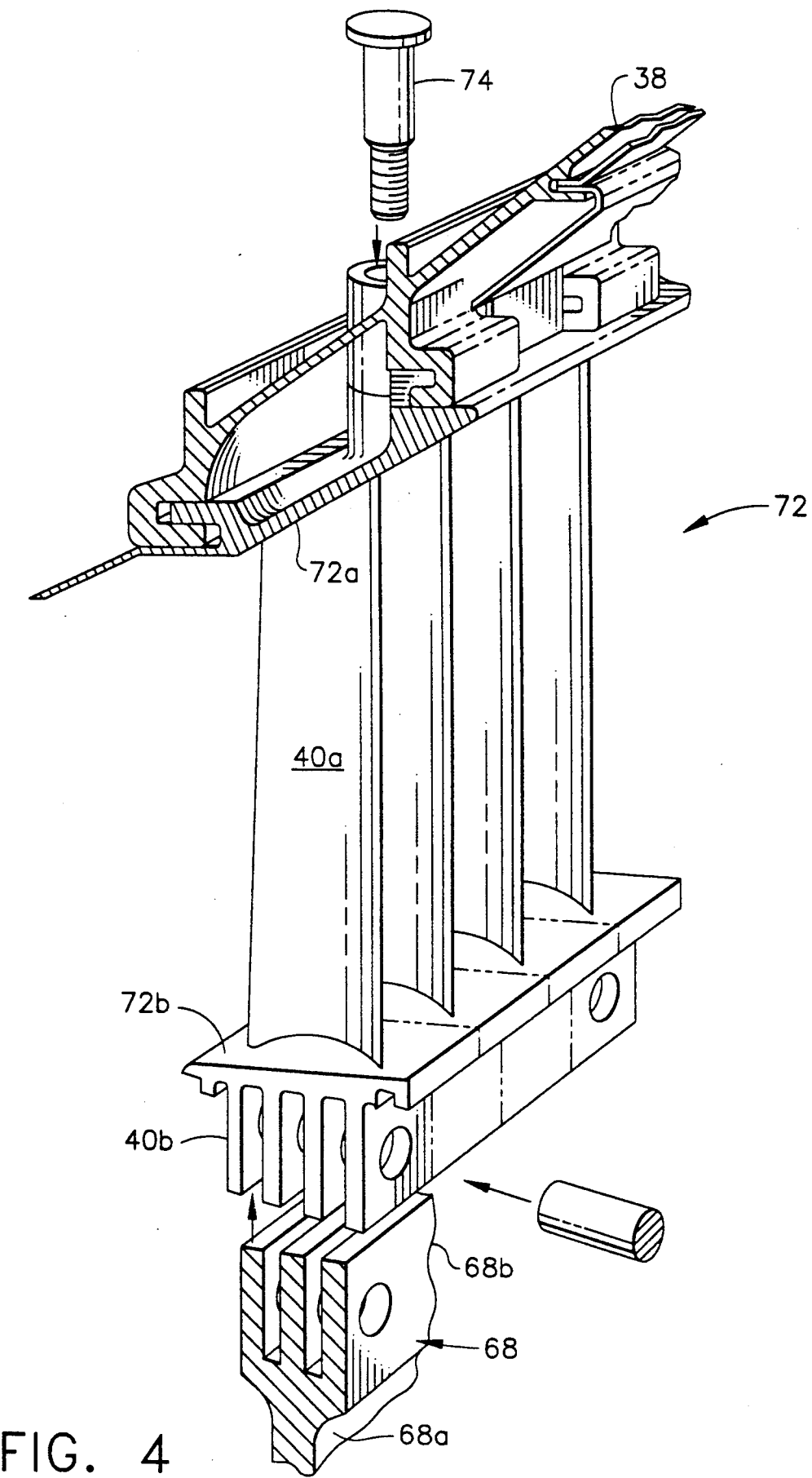
FIG. 4 is an exploded, perspective, partly sectional view of an exemplary configuration of segmented groups of the outer blades illustrated in FIG. 2 joined to the outer rotor at one end and to a rotor disk at an opposite end.

Referring to FIGS. 2-4, at least one or all of the rings 68 includes an annular solid hub 68a having a plurality of axially spaced apart, annular, radially outwardly extending fingers 68b fixedly joined to complementary fingers 40b extending radially inwardly from the tips of the outer blades 40. Suitable pins or bolts may extend axially through the interdigitated fingers 68b, 40b to retain the ring 68 to the outer blade row. FIG. 3 illustrates in more particularly the joint between the rings 68 and the outer blades 40 for the exemplary forwardmost row of blades 40. The interdigitated fingers 68b and 40b are illustrated with the retaining pin extending axially therethrough in phantom line.

Similarly, the inner rotor 42 preferably also includes a plurality of axially spaced apart annular disks 70 as shown in FIG. 2 fixedly joined together to define the inner rotor 42 and for supporting respective rows of the inner blades 44 conventionally removably fixedly joined to the perimeters thereof by axial entry type dovetails (not shown).

In the exemplary embodiment illustrated in FIG. 2, the aft end of the outer rotor 38 is supported by the rotating aft frame 48. However, instead of using a rotating forward frame at the forward end of the outer rotor 38, loads from the outer rotor 38 are carried directly through the stage-one outer blades 40a joined at their radially inner ends by a forwardmost one of the rings 68 configured in the form of a conventional disk, like the disks 70, having enlarged rims, thin webs, and enlarged hubs. The forward support shaft 54 is in turn fixedly joined to the forward disk 68 for rotation therewith and for carrying loads from the outer rotor 38 to the mid-frame 50 through the forward bearing 56.

In order to maximize tangential and axial stiffness of the outer rotor 38, the outer blades 40 of each of the rows are preferably grouped together in pluralities of arcuate segments 72 as shown in FIG. 4 collectively completing the full 360° row. Each segment 72 has a plurality of the outer blades 40, such as the four stage-one blades 40a illustrated in FIG. 4, fixedly joined at radially outer ends thereof to an arcuate outer shroud 72a, and fixedly joined at radially inner ends thereof to an arcuate inner shroud 72b. The fingers 40b extend radially inwardly from the inner shroud 72b for mating with the complementary fingers 68b of the ring 68 through which is positioned the retaining pins illustrated. If desired, each of the inner shrouds 72b may be severed between the adjacent blades 40a (shown in phantom) for improving thermal expansion and contraction without undesirable stresses therefrom during operation.

Figure 5:
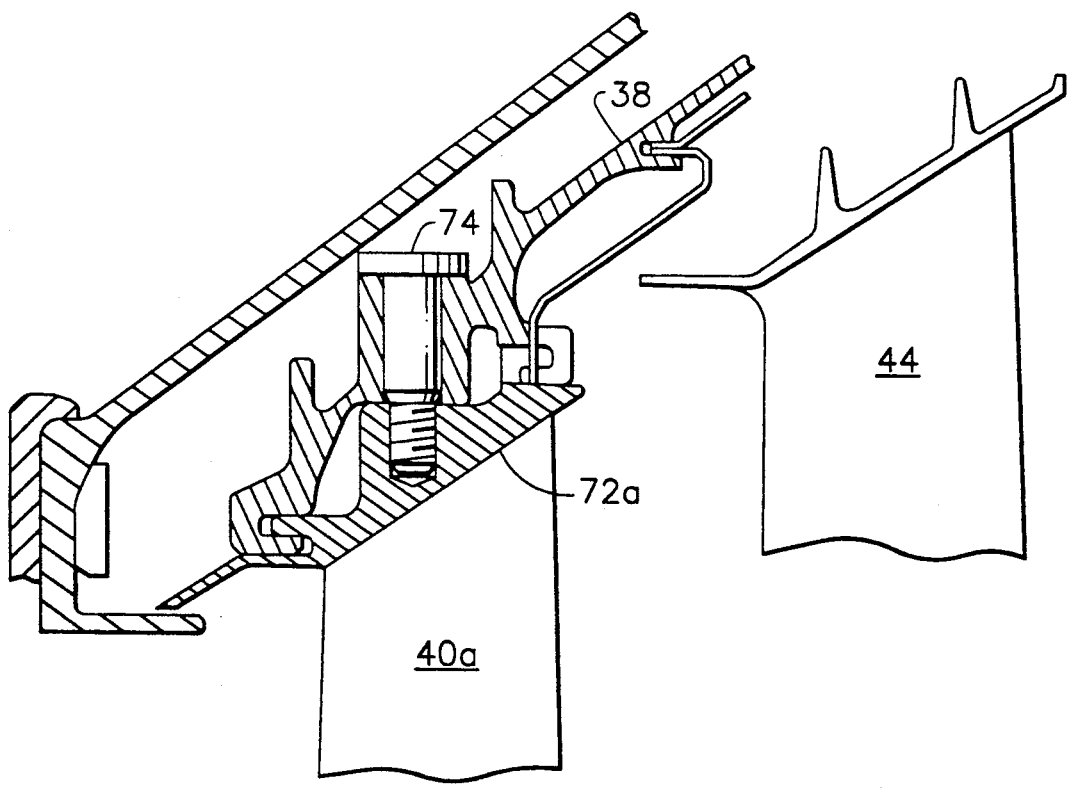
FIG. 5 is an enlarged partly sectional view of a radially outer end of the blade segment illustrated in FIG. 4 joined to the outer rotor by its outer shroud and retaining bolt.

The outer shrouds 72a may have conventional retention flanges as illustrated in FIGS. 4 and 5 supported in complementary retention slots in the outer rotor 38 and locked in position therein by a conventional bolt 74 extending through the outer rotor 38 and into a suitable boss formed in the outer shroud 72a. Other conventional support arrangements such as those typically found in low pressure turbine vanes may be used as desired for attaching the segment 72 to the outer rotor 38.

The improved rigidity of the blade segment 72 allows the segment 72 to more readily withstand rotor torque transmitted from the blades 40 to the outer rotor 38, and also increases compressive column buckling capability of the blades 40. This allows the blades 40 to be operated at blade tip speeds in excess of 550 feet/second (168 m/s) which is substantially higher than those speeds in conventional counterrotating power turbines.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims.

We claim:

1. A counterrotating turbine support assembly comprising:
   an annular outer casing;
   an annular outer rotor disposed radially inwardly of said outer casing and having a plurality of axially spaced apart rows of radially inwardly extending outer blades rotatable therewith;
   an annular inner rotor disposed radially inwardly of said outer rotor and having a plurality of axially spaced apart rows of radially outwardly extending inner blades axially interdigitated with said outer blades;
   an annular rear frame disposed axially aft of said outer and inner rotors and fixedly joined to said outer casing;
   an annular mid-frame disposed axially forwardly of said outer and inner rotors and fixedly joined to said outer casing;
   an annular forward support shaft fixedly joined at a radially outer end thereof to a forward end of said outer rotor, and rotatably supported by a forward bearing at a radially inner end thereof, said forward bearing being supported by said mid-frame;
   an annular aft support shaft fixedly joined at a radially outer end thereof to an aft end of said outer rotor, and rotatably supported by an aft bearing at a radially inner end thereof, said aft bearing being supported by said rear frame; and
   an annular intermediate support shaft fixedly joined at a radially outer end thereof to said inner rotor, and rotatably supported by an intermediate bearing at a radially inner end thereof, said intermediate bearing being supported by said mid-frame;

wherein said forward support shaft and said forward bearing cooperate with said aft support shaft and said aft bearing to enhance control of an in-plane rocking motion of said outer rotor.

2. A counterrotating turbine support assembly comprising:

an annular outer casing;

an annular outer rotor disposed radially inwardly of said outer casing and having a plurality of axially spaced apart rows of radially inwardly extending outer blades rotatable therewith;

an annular inner rotor disposed radially inwardly of said outer rotor and having a plurality of axially spaced apart rows of radially outwardly extending inner blades axially interdigitated with said outer blades;

an annular rear frame disposed axially aft of said outer and inner rotors and fixedly joined to said outer casing;

an annular mid-frame disposed axially forwardly of said outer and inner rotors and fixedly joined to said outer casing;

an annular forward support shaft fixedly joined at a radially outer end thereof to a forward end of said outer rotor, and rotatably supported by a forward bearing and a radially inner end thereof;

an annular aft support shaft fixedly joined at a radially outer end thereof to an aft end of said outer rotor, and rotatably supported by an aft bearing at a radially inner end thereof; and an annular intermediate support shaft fixedly joined at a radially outer end thereof to said inner rotor, and rotatably supported by an intermediate bearing at a radially inner end thereof;

wherein:

said forward support shaft is directly supported by said forward bearing on said midframe;

said intermediate support shaft is directly supported by said intermediate bearing on said mid-frame; and said aft support shaft is directly supported by said aft bearing on said rear frame.

3. An assembly according to claim 2 wherein said outer blades of each of said rows are grouped together in pluralities of arcuate segments, each segment having a plurality of outer blades fixedly joined at radially outer ends to an arcuate outer shroud, and fixedly joined at radially inner ends to an arcuate inner shroud for increasing tangential and axial stiffness of said outer rotor.

4. An assembly according to claim 2 wherein said mid-frame includes an inner support shaft extending radially inwardly and axially aft, and said forward bearing is mounted radially outwardly of an aft end of said inner support shaft, and said intermediate bearing is mounted radially inwardly of said aft end of said inner support shaft.

5. An assembly according to claim 3 further comprising a differential bearing disposed between said intermediate support shaft and said aft support shaft for controlling radial dynamic motion of said outer rotor and critical frequencies of said inner rotor.

6. An assembly according to claim 2 further comprising an annular rotatable aft frame disposed axially aft of said outer and inner blades and axially forward of said rear frame, and including a plurality of circumferentially spaced apart struts fixedly joined to radially outer and inner annular aft bands, with said outer band being fixedly joined to said outer rotor, and said inner band being fixedly joined to said aft support shaft for rotation therewith and for carrying loads from said outer rotor to said rear frame through said aft bearing.

7. An assembly according to claim 6 further comprising an annular forward disk fixedly joined to a forwardmost row of said outer blades for support thereof, and wherein said forward support shaft is fixedly joined to said forward disk for rotation therewith and for carrying loads from said outer rotor to said mid-frame through said forward bearing.

8. An assembly according to claim 2 further comprising a plurality of axially spaced apart annular rings disposed radially between said outer blades and said inner rotor, each of said rings being fixedly joined to radially inner ends of said outer blades of respective ones of said rows for reacting centrifugal radial loads on said outer blades.

9. An assembly according to claim 8 when at least one of said rings comprises an annular solid hub having a plurality of axially spaced apart radially outwardly extending fingers fixedly joined to complementary fingers extending radially inwardly from said outer blades.

10. An assembly according to claim 8 wherein said inner rotor comprises a plurality of axially spaced apart annular disks fixedly joined together for supporting respective rows of said inner blades fixedly joined thereto.

* * * * *